United States Patent [19]

Iwahashi et al.

[11] Patent Number: 4,692,834
[45] Date of Patent: Sep. 8, 1987

[54] ELECTROSTATIC DISCHARGE PROTECTION CIRCUIT WITH VARIABLE LIMITING THRESHOLD FOR MOS DEVICE

[75] Inventors: Hiroshi Iwahashi, Yokohama; Masamichi Asano, Tokyo; Akira Narita, Kawasaki, all of Japan

[73] Assignees: Kabushiki Kaisha Toshiba, Kawasaki; Tosbac Computer System Co., Ltd., Tokyo, both of Japan

[21] Appl. No.: 761,707

[22] Filed: Aug. 2, 1985

[30] Foreign Application Priority Data

Aug. 20, 1984 [JP] Japan ................... 59-172559

[51] Int. Cl.⁴ .............................................. H02H 3/20
[52] U.S. Cl. .................... 361/91; 307/200.13; 361/56
[58] Field of Search ............. 361/88, 91, 110, 111, 361/56; 307/200 A, 200 B, 550, 568; 323/226, 229

[56] References Cited

U.S. PATENT DOCUMENTS 4,086,642 4/1978 Yoshida et al. .................. 361/91
4,288,829 9/1981 Tango .............................. 361/91
4,385,337 5/1983 Asano et al. ..................... 361/91
4,481,521 11/1984 Okumura ......................... 361/56
4,527,213 8/1985 Arizumi ........................... 361/91
4,541,002 10/1985 Shimada .......................... 361/91

Primary Examiner—A. D. Pellinen
Assistant Examiner—Jeffrey A. Gaffin
Attorney, Agent, or Firm—Finnegan, Henderson, Farabow, Garrett & Dunner

[57] ABSTRACT

An electrostatic discharge protection circuit is provided with a variable threshold for limiting the potential of an input signal having a given high or low voltage, and is adapted to an EPROM containing an input MOS transistor which is responsive to the input signal. The protection circuit is associated with an input terminal for receiving the input signal. The input terminal is coupled to the gate of the input MOS transistor. The protection circuit also includes a circuit element for limiting or suppressing the input signal potential at the variable threshold. The gate of the input MOS transistor receives the potential limited signal from the circuit element. The circuit element is responsive to a given threshold control potential. The variable threshold is enhanced by the given threshold control potential when a high-voltage input signal is applied to the input terminal.

12 Claims, 6 Drawing Figures 4,692,834

ELECTROSTATIC DISCHARGE PROTECTION CIRCUIT WITH VARIABLE LIMITING THRESHOLD FOR MOS DEVICE

BACKGROUND OF THE INVENTION

The present invention relates to an improvement of an electrostatic discharge protection circuit for a MOS device, particularly to an input circuit with a variable limiting threshold for preventing overvoltage from damaging a MOS-input semiconductor integrated circuit which is to be responsive to a high-voltage input signal.

Generally speaking, for an insulated-gate field effect transistor (MOS transistor) being formed with a metallic gate, insulation film and semiconductor elements, any countermeasure to avoid a faulty application of overvoltage to the gate electrode should be adapted. This is because such a faulty overvoltage application will rupture the electrical insulation of the gate insulation film and results in permanently damaging the MOS semiconductor device with a slight supply of power.

The gate oxide ruptures when the dielectric strength of the gate oxide, made of, e.g., silicon dioxide, is more than approximately $10^7$ V/cm. Thus, if a voltage of 30–50 V is applied across a 300–500 Å thick gate oxide, a rupture occurs. It is conventionally known that such permanent damage can be prevented by adapting an input protection circuit which simply suppresses the peak potential of an input voltage below the voltage at which a rupture occurs.

However, when the above conventional input protection circuit is applied to an ultraviolet erasable non-volatile semiconductor memory (EPROM) or an electric erasable non-volatile semiconductor memory (EEPROM) and, if an input terminal of an EPROM or an EEPROM is designed to be commonly used for a low-voltage signal input and high-voltage signal input (whose potential will not cause said permanent damage), a certain problem arises. That is, when a high-voltage signal is supplied to the input terminal, the input protection circuit with a given fixed input limiting threshold could respond to the potential of a high-voltage input signal so that the necessary high-voltage component exceeding the input limiting threshold is suppressed or blocked. Such inconvenience cannot be avoided according to said conventional input protection circuit.

SUMMARY OF THE INVENTION

It is accordingly an object of the present invention to provide an electrostatic discharge protection circuit for protecting from overvoltage damage a MOS-input device which is to be responsive to a high-voltage input signal.

To achieve the above object an electrostatic discharge protection circuit of the invention has a variable limiting threshold for an input signal.

Specifically, the protection circuit for a MOS-input semiconductor integrated circuit according to an embodiment of the present invention is provided with a gate-controlled diode utilizing a gate-controlled drain avalanche breakdown. In this embodiment a preselected potential is continuously or optionally applied to the gate of the gate-controlled diode from the exterior or interior of the integrated circuit, so that the potential limiting threshold for the input signal is enhanced. Then, a high-voltage input signal for the MOS-input semiconductor integrated circuit is free from the potential limiting operation, and the integrated circuit can receive the information of the high-voltage input signal.

DETAILED DESCRIPTION OF THE PREFERRED EMBODIMENTS

In the following, preferred embodiments of the invention will be described with reference to the accompanying drawings.

Figure 1:
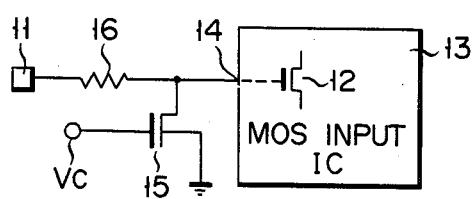
FIG. 1 shows a circuit configuration of an embodiment according to the present invention, in which a gate-controlled MOS diode with a fixed gate potential is employed.

FIG. 1 shows an electrostatic discharge protection circuit for protecting from overvoltage damage a MOS-input device which is to be responsive to a high-voltage input signal. A signal input terminal 11 receives an input signal. Terminal 11 is coupled via a resistor element 16 to an input node 14 of a MOS-input semiconductor integrated circuit 13 which contains an input MOS transistor 12 having a gate coupled to node 14. Node 14 is coupled to a circuit-ground (substrate) via a gate-controlled MOS diode 15 having a predetermined gate-controlled breakdown voltage ($V_{SB}$). The gate of diode 15 receives a power source potential Vc (e.g., 5 volts).

According to the circuit of FIG. 1 the potential difference between the gate and drain of MOS diode 15 becomes Vc, because the gate receives potential Vc while the drain potential is substantially zero when no signal is input to terminal 11. In this case the gate-controlled breakdown voltage of diode 15 is equivalently increased by Vc. This means that the limiting threshold or protection-free potential for an input signal is increased by Vc from the intrinsic gate-controlled breakdown voltage $V_{SB}$ of MOS diode 15 with zero-gate potential. That is, the limiting threshold for an input signal potential can be made variable according to the gate potential of MOS diode. 15, and the responsive potential of the input signal can be set at a high value in proportion to the gate potential. On the other hand, during shipping and handling of the semiconductor integrated circuit device prior to installation in electronic equipment (during which time damage due to electrostatic discharge is highly likely to occur), the gate of input MOS transistor 12 is protected perfectly, because no power is supplied to the integrated circuit device so that Vc=0 and the limiting threshold for the input signal potential is set at a low value which is substantially equal to the intrinsic gate-controlled breakdown voltage of MOS diode 15 with zero-gate potential.

Resistor element 16 between input terminal 11 and input node 14 serves to suppress an excessive input current fed into diode 15 and also to reduce the rate of change of an input signal voltage with a rapid potential change, thereby achieving the protection not only for input MOS transistor 12 but also for gate-controlled MOS diode 15. The resistance value of resistor element 16 is preferably 1-2 kohm.

Figure 2:
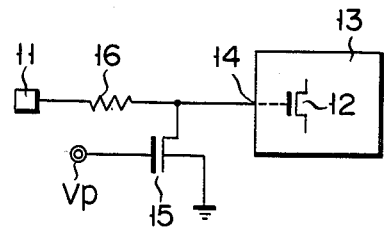
FIG. 2 shows a modification of the FIG. 1 circuit.

FIG. 2 shows another embodiment of the present invention, in which a high-voltage power source Vp (e.g., 21 volts) is coupled to the gate of gate-controlled MOS diode 15. Similar to the embodiment of FIG. 1, since the gate of diode 15 receives high potential Vp, the effective gate-controlled breakdown voltage of diode 15 is highly increased by Vp. In other words, the responsive potential of the input signal is enhanced to a special high value by means of the application of gate potential Vp. High potential Vp may be obtained from an external power source, or it may be obtained by stepping-up the internal low power source potential Vc through a DC-DC converter or the like.

Figure 3:
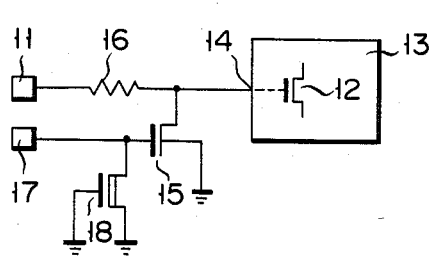
FIG. 3 shows a circuit configuration of another embodiment of the present invention, in which a gate-controlled MOS diode with a variable gate potential is employed.

FIG. 3 shows still another embodiment of the present invention. In this embodiment the gate of gate-controlled MOS diode 15 is coupled to a limiting threshold control terminal 17. Terminal 17 is circuit-grounded via the drain-source path of a depletion MOS transistor 18. The gate of transistor 18 is circuit-grounded. Terminal 17 optionally receives a limiting threshold control potential from an external circuit. With the application of a prescribed threshold control potential to terminal 17, gate-controlled MOS diode 15 can be free from breakdown due to a high-voltage signal input to terminal 11.

The maximum responsive signal potential at input terminal 11 is determined by the control potential applied to terminal 17. By this control potential at terminal 17, the gate-controlled breakdown of MOS diode 15 is set at a value which ensures the protection for MOS-input semiconductor circuit 13 even under a condition that an excessive high potential is erroneously applied to input terminal 11. That is, the gate-controlled breakdown voltage of diode 15 (i.e., the input limiting threshold of the protection circuit) can be varied or modified in accordance with the condition for an input signal voltage by adjusting the potential applied to control terminal 17.

In the embodiment of FIG. 3, depletion transistor 18 serves to discharge electric charges stored at the gate circuit of MOS diode 15, thereby keeping the gate of diode 15 always at the circuit ground potential. When the gate of diode 15 is fixed at the circuit ground potential, the gate-controlled breakdown with zero gate potential is effected by diode 15. When any input, such as a large noise, is applied to input terminal 17 while no discharging transistor 18 is provided, the gate potential of diode 15 could be kept high by the gate capacitance of diode 15. To prevent such noise, discharging transistor 18 is specially provided.

Figure 4:
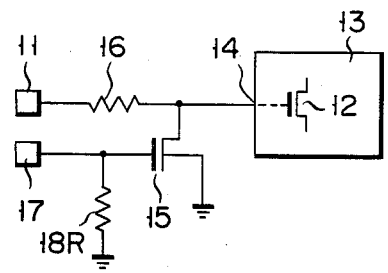
FIG. 4 shows a modification of the FIG. 3 circuit.

Incidentally, such a discharging transistor 18 may be replaced by a simple resistor element 18R, as shown in FIG. 4.

Figure 5:
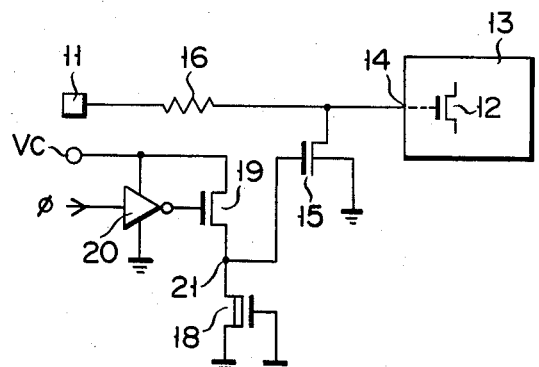
FIG. 5 shows another modification of the FIG. 3 circuit.

FIG. 5 shows yet another embodiment of the present invention. In this embodiment the gate of gate-controlled MOS diode 15 is circuit-grounded via the drain-source path of depletion MOS transistor 18. The gate of transistor 18 is circuit-grounded. The gate of transistor 15 is also coupled to a node 21 or the source of an enhancement MOS transistor 19. The drain of transistor 19 receives power source potential Vc. The gate of transistor 19 receives an output from an inverter 20. Inverter 20 receives at its input terminal a given internal signal $\phi$. Assume that the logic level of internal signal $\phi$ becomes "0" before a high-voltage signal is applied to input terminal 11, and the power source potential of inverter 20 is Vc. Under this assumption, the output logic level of inverter 20 is "1" (=Vc) if the level of internal signal $\phi$ is "0". Then, transistor 19 turns on and a potential, which is lower than power source potential Vc by the gate-source threshold voltage of transistor 19, appears at node 21. This node 21 potential is applied to the gate of MOS diode 15.

According to the above circuit configuration, the gate-controlled breakdown voltage of MOS diode 15 can be made high at the time when a high-voltage input signal is to be applied to input terminal 11. When no high-voltage signal is applied to terminal 11 but noises with high potentials are applied thereto, the potential of node 21 or the gate potential of MOS diode 15 is set at "0". In this case, MOS diode 15 breaks down with the gate-controlled breakdown voltage under zero gate potential, so that MOS-input semiconductor circuit 13 is free from the high potential noises.

Figure 6:
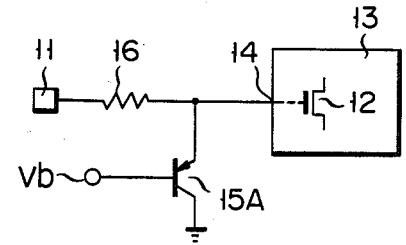
FIG. 6 shows a circuit configuration of another embodiment of the present invention, in which a bipolar transistor with a fixed or variable base potential is employed.

FIG. 6 shows a circuit configuration of another embodiment of the present invention. In the embodiment of FIG. 6 a PNP bipolar transistor 15A is used in place of a gate-controlled MOS diode. The base of transistor 15A is responsive to a fixed or variable base potential Vb. When the potential at input node 14 exceeds the given base potetial Vb of the base-emitter threshold voltage of transistor 15A, transistor 15A is rendered conductive so that node 14 is shunted to the circuit ground, thereby achieving the input circuit protection.

As will be understood from the above description, the limiting threshold for the circuit protection is varied by a threshold control potential (Vc, Vp, Vb, etc.) continuously or optionally applied to the gate (or base) of a protection diode 15 (or protection transistor 15A). From this, MOS-input semiconductor circuit 13 is protected from damage due to an excessive high surge voltage input, while no signal blocking is effected for a high-voltage signal input so that semiconductor circuit 13 can respond to such a high-voltage signal input.

While the invention has been described in connection with what is presently considered to be the most practical and preferred embodiment, it is understood that the invention is not to be limited to the disclosed embodiment but, on the contrary, is intended to cover various modifications and equivalent arrangements included within the scope of the appended claims, said scope is to be accorded the broadest interpretation so as to encompass all such modifications and equivalent structures. For instance, MOS-input circuit 13 may include a digital circuit other than EPROM/EEPROM, or it may include a MOS-input analog circuit.

Finally, the following document is incorporated in this specification which discloses the details of a gate-controlled diode.

"Physics and Technology of
Semiconductor Devices"
A.S.GROVE
Fairchild Semiconductor, Palo Alto
University of California, Berkeley
John Wiley and Sons, Inc., New York, London,
 Sydney. ©1967

What is claimed is:

1. A variable-threshold electrostatic discharge protection circuit in combination with an associated semiconductor device containing an input MOS transistor having an input gate, said input MOS transistor being operative from a power source potential and a reference potential and being responsive to a reference level input signal and to high and low level input signals, said protection circuit comprising:
- an input terminal receiving said reference level input signal and said high and low level input signals, said input terminal being coupled to said input gate of said input MOS transistor of said associated semiconductor device; and
- a gate-controlled MOS diode connected between said input gate of said input MOS transistor of said associated semiconductor device and said reference potential of said input MOS transistor for limiting at a variable threshold the voltage applied to said input gate of said MOS input transistor, said diode having a control gate and being responsive to a given threshold control potential applied to said control gate to increase said variable threshold to limit the voltage at said input terminal to a value above said high level input signal when said high level input signal is applied to said input terminal.

2. A protection circuit according to claim 1, wherein said given thtreshold control potential corresponds to said power source potential of said associated semiconductor device.

3. A protection circuit according to claim 1, further comprising a resistor element coupled between said input terminal and said gate-controlled MOS diode.

4. A protection circuit according to claim 1, wherein said given threshold control potential is higher than said power source potential of said associated semiconductor device.

5. A protection circuit according to claim 1, wherein said gate-controlled MOS diode includes a gate circuit and wherein said protection circuit further comprises discharge means, coupled to said control gate, for discharging electric charges stored at said gate circuit.

6. A protection circuit according to claim 5, further comprising means, coupled to said gate circuit of said gate-controlled MOS diode, for changing the value of said given threshold control potential in accordance with whether said high voltage input signal or said low voltage input signal is applied to said input terminal.

7. A variable-threshold electrostatic discharge protection circuit in combination with an associated semiconductor device containing an input MOS transistor having an input gate, said input MOS transistor being operative from a power source potential and a reference potential and being responsive to a high and low level input signals, said protection circuit comprising:
- an input terminal receiving high and low level input signals, said input terminal being coupled to said input gate of said MOS transistor of said associated semiconductor device; and
- a bi-polar transistor having an emitter-collector path connected between said gate of said input MOS transistor of said associated semiconductor device and said reference potential of said associated input MOS transistor for limiting at a variable threshold the voltage applied to said input gate of said MOS input transistor, said bi-polar transistor having a base and being responsive to the absence of a given threshold control potential applied to said base to limit the voltage at said input terminal to a value below said high level input signal and responsive to the application of a given threshold control potential applied to said base to increase said variable threshold to limit the voltage at said input terminal to a value above said high level input signal when said high level input signal is applied to said input terminal.

8. A protection circuit according to claim 7, wherein said given threshold control potential corresponds to said power source potential of said associated semiconductor device.

9. A protection circuit according to claim 7, wherein said given threshold control potential is higher than said power source potential of said associated semiconductor device.

10. A protection circuit according to claim 7, further comprising a resistor element coupled between said input terminal and said bi-polar transistor.

11. An MOS semiconductor device comprising
- a semiconductor substrate having a substrate potential;
- an input terminal for receiving an input signal;
- an input MOS transistor having a gate coupled to said input terminal;
- a gate-controlled MOS diode, which has a breakdown voltage controlling gate, coupled between said gate of said input MOS transistor and said substrate; and
- means for supplying said breakdown voltage controlling gate of said gate-controlled MOS diode with a voltage having a potential higher than said semiconductor substrate potential.

12. A semiconductor integrated circuit responsive to high and low voltage level input signals, comprising:
- a semiconductor circuit operative from a power source potential and a reference potential, said semiconductor circuit being responsive to a high voltage level input signal to perform a first function and being responsive to a low voltage level input signal to perform a second function, said semiconductor circuit comprising an input MOS transistor having an input gate;
- an input terminal coupled to said input gate of the MOS transistor of said semiconductor circuit receiving said input signals; and
- limiter means, coupled to said said input gate and responsive to a given thereshold control potential, for limiting at a variable threshold the voltage applied to said input gate, said variable threshold being increased according to said given threshold control potential to permit performance of said first function upon occurrence of said high level input signal.

* * * * *

REEXAMINATION CERTIFICATE (1937th)
United States Patent [19]
Iwahashi et al.

[11] B1 4,692,834
[45] Certificate Issued  Mar. 2, 1993

[54] ELECTROSTATIC DISCHARGE PROTECTION CIRCUIT WITH VARIABLE LIMITING THRESHOLD FOR MOS DEVICE

[75] Inventors: Hiroshi Iwahashi, Yokohama; Masamichi Asano, Tokyo; Akira Narita, Kawasaki, all of Japan

[73] Assignees: Kabushiki Kaisha Toshiba, Kawasaki; Tosbac Computer System Co., Ltd., Tokyo, both of Japan

Reexamination Request:
No. 90/002,809, Aug. 11, 1992

Reexamination Certificate for:
Patent No.: 4,692,834
Issued: Sep. 8, 1987
Appl. No.: 761,707
Filed: Aug. 2, 1985

[30] Foreign Application Priority Data
Aug. 20, 1984 [JP] Japan .................. 59-172559

[51] Int. Cl.⁵ .................. H02H 3/20
[52] U.S. Cl. .................. 361/91; 361/56; 365/226
[58] Field of Search .................. 361/56, 88, 91, 110, 361/111; 307/550, 568; 323/226, 229; 365/226

[56] References Cited
U.S. PATENT DOCUMENTS
4,037,140 4/1976 Eaton, Jr. .................. 361/56
4,282,556 5/1979 Ipri .................. 361/56

FOREIGN PATENT DOCUMENTS
0042305 12/1981 European Pat. Off.
A910430 11/1962 United Kingdom.
A1190781 5/1970 United Kingdom.

OTHER PUBLICATIONS
IBM Technical Disclosure Bulletin, vol. 22, No. 10, Mar. 1980, Hoffman et al., dated Mar. 1980.

*Primary Examiner*—Jeffrey A. Gaffin

[57] ABSTRACT

An electrostatic discharge protection circuit is provided with a variable threshold for limiting the potential of an input signal having a given high or low voltage, and is adapted to an EPROM containing an input MOS transistor which is responsive to the input signal. The protection circuit is associated with an input terminal for receiving the input signal. The input terminal is coupled to the gate of the input MOS transistor. The protection circuit also includes a circuit element for limiting or suppressing the input signal potential at the variable threshold. The gate of the input MOS transistor receives the potential limited signal from the circuit element. The circuit element is responsive to a given threshold control potential. The variable threshold is enhanced by the given threshold control potential when a high-voltage input signal is applied to the input terminal.

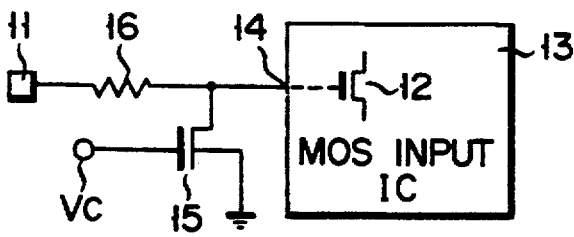

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6, 11 and 12 are cancelled.

Claims 1, 2 and 7 are determined to be patentable as amended.

Claims 3–5 and 8–10, dependent on an amended claim, are determined to be patentable.

1. A variable-threshold electrostatic discharge protection circuit in combination with an associated semiconductor device containing an input MOS transistor having an input gate, said input MOS transistor being operative from a power source potential and a reference potential and being responsive to a reference level input signal and to high and low level input signals, said protection circuit comprising:
   an input terminal receiving said reference level input signal and said high and low level input signals, said input terminal being coupled to said input gate of said input MOS transistor of said associated semiconductor device; [and]
   a gate-controlled MOS diode connected between said input gate of said input MOS transistor of said associated semiconductor device and said reference potential of said input MOS transistor for limiting at a variable threshold the voltage applied to said input gate of said MOS input transistor, said diode having a control gate and being responsive to a given threshold control potential applied to said control gate to increase said variable threshold to limit the voltage at said input terminal to a value above said high level input signal when said high level input signal is applied to said input terminal; and
   *means, coupled to the control gate of gate-controlled MOS diode, for changing the value of said given threshold potential in accordance with whether said high voltage input signal or said low voltage input signal is applied to said input terminal.*

2. A protection circuit according to claim 1, wherein said given [thtreshold] *threshold* control potential corresponds to said power source potential of said associated semiconductor device.

7. A variable-threshold electrostatic discharge protection circuit in combination with an associated semiconductor device containing an input MOS transistor having an input gate, said input MOS transistor being operative from a power source potential and a reference potential and being responsive to [a] high and low level input signals, said protection circuit comprising:
   an input terminal receiving high and low level input signals, said input terminal being coupled to said input gate of said MOS transistor of said associated semiconductor device; and
   a bi-polar transistor having an emitter-collector path connected between said gate of said input MOS transistor of said associated semiconductor device and said reference potential of said associated input MOS transistor for limiting at a variable threshold the voltage applied to said input gate of said MOS input transistor, said bi-polar transistor having a base and being responsive to the absence of a given threshold control potential applied to said base to limit the voltage at said input terminal to a value below said high level input signal and responsive to the application of a given threshold control potential applied to said base to increase said variable threshold to limit the voltage at said input terminal to a value above said high level input signal when said high level input signal is applied to said input terminal.

* * * * *